United States Patent

[11] 3,569,737

| | | | |
|---|---|---|---|
| [72] | Inventors | Douglas M. Bauer | |
| | | Danvers; | |
| | | Gerfried M. Gozemba, Marblehead, Mass. | |
| [21] | Appl. No. | 745,421 | |
| [22] | Filed | July 17, 1968 | |
| [45] | Patented | Mar. 9, 1971 | |
| [73] | Assignee | General Electric Company | |

[54] FREQUENCY TO D-C CONVERTER
5 Claims, 4 Drawing Figs.

[52] U.S. Cl.................................................... 307/233,
307/246, 307/251, 307/279, 307/295, 307/313,
324/78, 328/127, 328/140
[51] Int. Cl......................................................... H03k 5/20
[50] Field of Search............................................ 307/233,
238, 240, 246, 251, 255, 271, 279, 288, 295, 304,
313; 328/136, 140, 127; 324/78 (E), 78 (I), 168
(Periodical), 70 (C-G)

[56] References Cited
UNITED STATES PATENTS

| 3,209,253 | 9/1965 | Gray.............................. | 307/233X |
| 3,317,756 | 5/1967 | Laporte......................... | 307/313X |
| 3,466,526 | 9/1969 | Cole............................... | 307/233UX |
| 3,488,520 | 1/1970 | Hunter........................... | 307/304X |

FOREIGN PATENTS

| 901,972 | 7/1962 | Great Britain................ | 328/140 |
| 911,634 | 11/1962 | Great Britain................ | 307/295 |
| 1,136,389 | 12/1956 | France........................... | 307/313 |

*Primary Examiner*—Stanley T. Drawczewicz
*Attorneys*—Richard E. Hosley, Frank L. Neuhauser, Oscar B. Waddell and Melvin M. Goldenberg ABSTRACT: A frequency to D-C converter. A frequency input signal alternately switches complementary field effect transistor gate electrodes between two reference voltages. Alternate conduction of the field effect transistors causes two series-connected capacitors, each in parallel with one field effect transistor, to be alternately charged and discharged. Charging currents are converted to D-C voltages proportional to frequency in a resistive filter network and are coupled to an indication circuit.

PATENTED MAR 9 1971　　　　　　　　　　　　　　　　3,569,737
SHEET 1 OF 2
FIG. 1
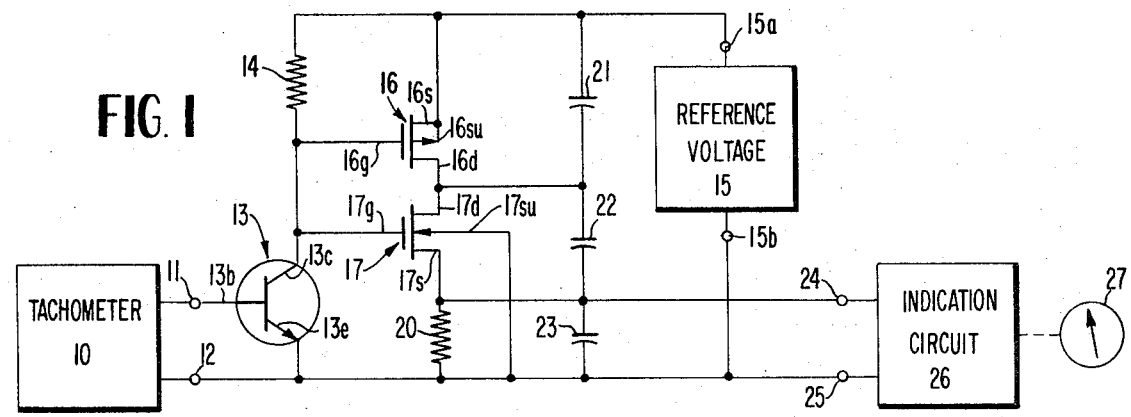
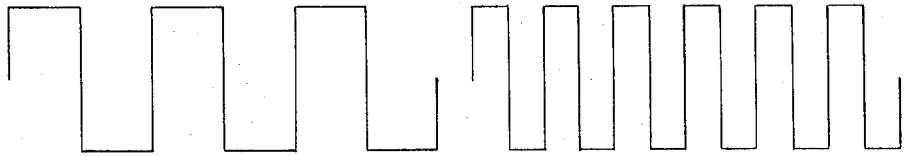
30. FREQUENCY INPUT SIGNAL
31. VOLTAGE AT COLLECTOR 13c
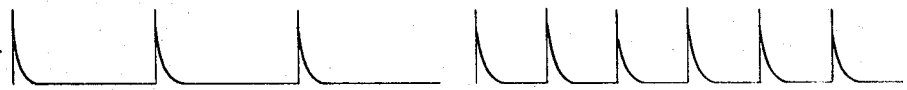
32. CAPACITOR C22 CHARGING CURRENT
33. CAPACITOR C21 CHARGING CURRENT
34. OUTPUT VOLTAGE AT TERMINALS 24 AND 25
FIG. 2
INVENTORS
DOUGLAS M. BAUER
GERFRIED M. GOZEMBA
BY *Richard E. Hosley*
ATTORNEY

INVENTORS
DOUGLAS M. BAUER
GERFRIED M. GOZEMBA

BY Richard E. Hosley

ATTORNEY 3,569,737

FREQUENCY TO D-C CONVERTER

BACKGROUND OF THE INVENTION

This invention generally relates to indicating instruments and more specifically to an instrument for indicating frequency values.

Prior art frequency to DC converters in indicating instruments incorporated a mechanical chopper circuit. The chopper operating speed was controlled by a variable frequency input signal. Usually the mechanical chopper comprised a single-pole, double-throw switch which alternately shunted one capacitor to charge another to a reference voltage. The capacitor charging currents produced during each half cycle energized an output circuit to generate a direct current voltage proportional to the applied frequency input signal.

Mechanical choppers have required a drive signal amplitude variable only within certain defined limits. If the drive signal fell below the minimum amplitude, unreliable operation occurred. Drive signals exceeding the maximum amplitude could produce harmful heating. Reliability of the mechanical chopper was also limited by its finite life. Further, there was usually an upper frequency limit for the drive signal; and this limit, coupled with a relatively large power requirement, limited the usefulness of the mechanical choppers.

In certain applications, specifically aircraft tachometer indicators, input signals vary over a range which exceeds the permissible amplitude range of the mechanical choppers. Its finite life introduces certain undesirable maintenance problems. Further, the large power consumption and also the relative size of the mechanical choppers prove to be disadvantageous in aircraft applications where space and power requirements are minimized whenever possible.

Therefore, it is an object of this invention to provide a frequency to DC converter which utilizes solid state components throughout.

Another object of this invention is to provide a frequency to DC converter in which mechanical choppers are eliminated.

Still another object of this invention is to provide a frequency to DC converter which is sensitive to a wide range of input frequencies and amplitudes.

SUMMARY

In accordance with one aspect of this invention a frequency to DC converter is energized by a signal which controls the conduction of complementary field effect transistors. Alternate conduction of the field effect transistors causes a pair of shunted capacitors to be alternately charged by a reference voltage source through an output circuit and the conducting field effect transistor and then discharged. The output circuit converts the unidirectional current pulses which charge the capacitors to a direct current voltage signal proportional to the input or switching frequency.

This invention is pointed out with particularity in the appended claims. A more thorough understanding of the above and further objects and advantages of this invention may be attained by referring to the following description of several embodiments taken in conjunction with the accompanying drawings.

BRIEF DESCRIPTION OF THE DRAWINGS

FIG. 1 is a schematic of a first embodiment of a frequency to DC converter constructed in accordance with this invention;

FIG. 2 is a graphical analysis of the operation of the circuit illustrated in FIG. 1;

DESCRIPTION OF ILLUSTRATIVE EMBODIMENTS

Figure 3:
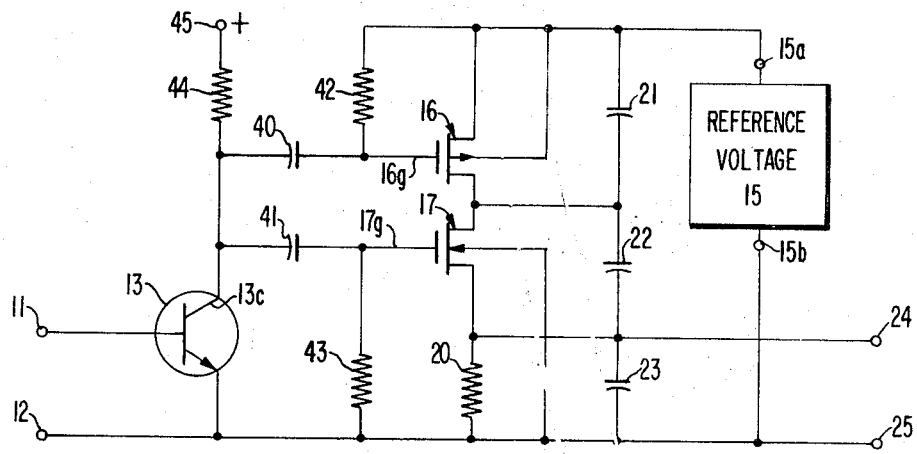
FIG. 3 is a schematic of a second embodiment of a frequency to DC converter constructed in accordance with this invention.

In the following discussion like numerals refer to like elements throughout. In FIG. 1 a variable frequency source is identified as a tachometer 10. This tachometer 10 generates a variable frequency voltage at terminals 11 and 12 which is an input signal for the circuit. In this particular embodiment, the frequency is proportional to a measured rotational speed. It will be obvious to those skilled in the art that any device which produces a signal with a frequency proportional to some monitored condition could be substituted for the tachometer 10.

The variable frequency input signal at the terminals 11 and 12 is applied to a switching transistor 13 to cause it to conduct on alternate half cycles. The base 13$b$ and the emitter 13$e$ are directly connected to the terminals 11 and 12 respectively. Collector-emitter bias is supplied by connecting the collector 13$c$ through a resistor 14 to a reference voltage source 15 with terminals 15$e$ and 15$b$.

A complementary pair of field effect transistors are coupled to the switching transistor 13 to be alternately switched on and off during alternate half cycles of the frequency input signal. The complementary pair is specifically shown as a "P" channel field effect transistor 16 and an "N" channel field effect transistor 17. Preferably these are enhancement mode field effect transistors. The gate electrodes 16$g$ and 17$g$ are connected to the collector 13$c$. Therefore, the voltage on the gates is at the reference voltage level when transistor 13 is not conducting and at the voltage at the terminal 12 when the transistor 13 is conducting. The field effect transistors 16 and 17 are connected in series with a resistor 20 to be energized by the reference voltage source 15. Specifically, the source electrode 16$s$ and the substrate electrode 16$su$ are connected to the terminal 15$a$. The drain electrode 16$d$ is connected to the drain electrode 17$d$. Connecting the source electrode 17$s$ to the terminal 15$b$ through the resistor 20 completes the circuit when the substrate electrode 17$su$ is tied to the terminal 15$b$.

Capacitors 21 and 22 parallel the drain and source electrodes 16$d$ and 16$s$ and 17$a$ and 17$s$ respectively. When the field effect transistor 17 conducts, current flows from the reference voltage source 15 through the capacitor 21, the field effect transistor 17 and an output circuit constituted by the resistor 20 in parallel with a filter capacitor 23. On the next succeeding half cycle the reference voltage source 15 charges the capacitor 22 through the field effect transistor 16 and the output circuit. Simultaneously, the capacitor 21 is discharged through the field effect transistor 16. A direct current voltage is developed across the resistor 20 and the capacitor 23 which is proportional to the switching frequency. This signal may then be coupled to terminals 24 and 25 to energize an indicator circuit 26 which could be used to drive an indicator 27.

A further understanding of the operation of the circuit illustrated in FIG. 1 may be attained by referring to the graphical analysis in FIG. 2. In the FIG. two input frequency signals are depicted as being applied. These are the square waves in time graph 30 which are under columns A and B for equal time periods T. Although square wave inputs are discussed, it will become obvious that any input signal which produces a zero crossing or which changes the conduction of the transistor 13 at a meaningful frequency may be utilized.

When the voltage across the base-emitter junction of the transistor 13 is positive, the voltage on the collector 13$c$ is substantially at the voltage of the terminal 12 as shown by graph 31. This bias on the gate electrodes 16$g$ and 17$g$ causes the field effect transistor 16 to conduct and field effect transistor 17 to turn off. A voltage reversal across the base-emitter junction turns off the transistor 13$c$ and causes the field effect transistor 17 to conduct and causes field effect transistor 16 to turn off.

If the resistor 20 and the capacitor 23 are selected so the output voltage is small in comparison to the reference voltage, and if the time constant for the field effect transistor and its charged capacitor is significantly smaller than the time duration for one-half cycle of the maximum input frequency, a constant charge is accumulated on one capacitor each time one field effect transistor conducts. For each positive pulse of the frequency input signal, a charging current is conducted through field effect transistor 16 and the capacitor 22 as shown in time graph 32. Time graph 33 illustrates the charging current through the field effect transistor 17 and the capacitor 21 during negative half cycles on the frequency input signal. The current-time products for the current pulses are constant and equal regardless of the frequency. As the frequency increases, the number of pulses per unit time also increases as shown in time graphs 32 and 33. As the charges are equal, a linear relationship exists between the input frequency and the DC output voltage. If sufficient filtering is applied, the output voltage at the terminals 24 and 25 appears as shown in time graph 34 for the two applied unput frequencies.

It has been found that the circuit illustrated in FIG. 1 is particularly adapted to square wave inputs and also to high frequency sine wave inputs. However, at slow switching speeds, a significant voltage slope can occur as the voltage at the collector 13c traverses between the reference voltage and zero. Simultaneous conduction of the field effect transistors 16 and 17 was possible over a mid range of the voltage slope. This situation is avoided in the circuit of FIG. 3. Two capacitors, 40 and 41, couple the gate electrodes 16g and 17g respectively to the collector 13c. This isolates the gate electrodes 16g and 17g from the direct current voltage on the collector 13c. Quiescent operating points are provided by resistors 42 and 43 connecting the gates 16g and 17g to the terminals 15a and 15b respectively. With this modification the waveform drives the gates above and below the quiescent operating point to insure that simultaneous conduction does not occur. As the peak-to-peak voltage appearing on the gates 16g and 17g remains constant, the forward bias is reduced by one-half. Therefore, in this embodiment the collector 13c is energized through a resistor 44 from a separate power supply represented by a terminal 45.

Figure 4:
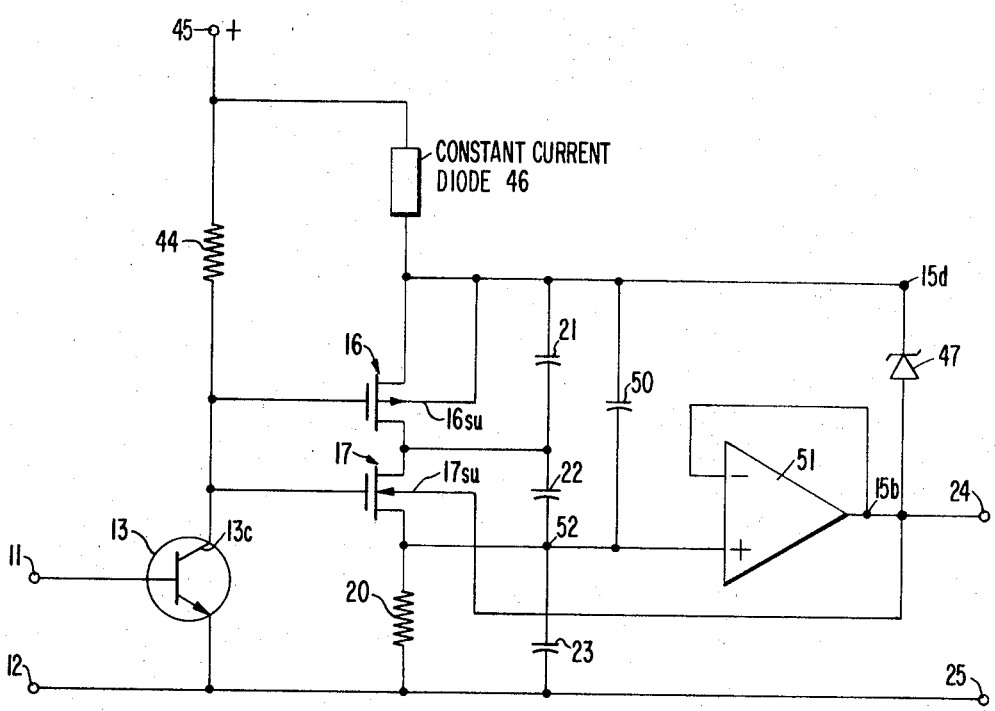
FIG. 4 is a schematic of a third embodiment of a frequency to DC converter constructed in accordance with this invention.

To obtain an operating condition which satisfies one of the aforementioned assumptions, there is generally a 200 to 1 relationship between the reference voltage and the output voltage. For example, a maximum output signal at the terminals 24 and 25 of 50 millivolts would be obtained with a 10 volt reference voltage. Greater output voltages may be obtained without increasing the reference voltage by using the circuit shown in FIG. 4.

Circuit bias is supplied from a power supply represented by the positive terminal 45. This voltage energizes the switching transistor 13 through the resistor 44. The reference voltage source 15 in FIGS. 1 and 3 specifically comprises a constant current source, shown as a constant current diode 46, and a zener diode 47 in series between the terminals 24 and 45. A capacitor 50 parallels the capacitors 21 and 22. Substrate electrodes 16su and 17su are connected to the reference voltage source terminals 15a and 15b.

The output circuit constituted by the resistor 20 and the capacitor 23 in FIGS. 1 and 3 is modified by adding a unity voltage gain operational amplifier 51 between a junction 52, formed by the field effect transistor 17, the resistor 20, the capacitor 22 and the capacitor 23, and the output terminal 24. The operational amplifier 51 must handle or sink the current through the zener diode 47. Operational amplifiers with unity voltage gain and the necessary current capacity are available and known. Therefore, the voltage energizing the capacitors 21 and 22 remains constant, and the charge per cycle on each capacitor remains equal. As this condition is met without regard for the value of the resistor 20, increasing the resistance increases the output voltage at the terminals 24 and 25 without altering the charge per cycle. Alternatively, the value of the capacitors 21 and 22 may be increased producing a greater charge per cycle. Either of these changes incorporated singly or in combination permit the output voltage level for a given input frequency to be elevated.

One example of another specific embodiment also illustrates the number of modifications which can be made to the disclosed circuits. In one particular application the capacitor 40 and the resistor 42 in the circuit of FIG. 3 have been eliminated to produce a hybrid circuit. The other circuit parameters are:

| | |
|---|---|
| Transistor 13 | 2N3417 |
| Field effect transistor 16 | 2N4352 |
| Field effect transistor 17 | 2N4351 |
| Resistor 20 | 1444 ohms Transistor |
| Capacitors 21, 22 | 0.022 mfd. |
| Capacitor 23 | 150 mfd. |
| Capacitor 41 | 0.33 mfd. |
| Resistor 43 | 1 megohm |

This circuit was energized by a reference voltage of 10 volts and a frequency input signal at the terminals 11 and 12 which saturated the transistor 13. This circuit was sensitive to a 0.7 Hz frequency input signal. The output voltage at the terminals 24 and 25 varied between 4.45 mv. and 53.1 mv. for a frequency input from 7 to 84 Hz and was accurate to within 0.25 percent. This accuracy was obtained with both square wave and sine wave frequency input signals.

The three illustrative embodiments in the FIGS. therefore basically illustrate a system which is capable of accurately indicating a wide range of input frequencies. In each embodiment a frequency input signal energizes a control circuit to cause a pair of complementary field effect transistors to conduct during alternate half cycles. Each half cycle a constant charge is applied to one of a pair of capacitors through the conducting field effect transistor and an output circuit. As the output circuit includes filtering means, a direct current voltage output is provided which is proportional to frequency. Alternatively, the spikes produced by charging the capacitors can be conducted to a digital output means. Therefore, it will be obvious that many modifications and alterations can be made to this invention without departing from the true spirit and scope of the invention. It is the object of the appended claims to cover all such alterations and modifications.

We claim:

1. A frequency to DC converter for energizing a utilization means with a signal proportional to the frequency of an input signal comprising:
   a. means for producing a reference voltage at first and second terminal thereof;
   b. output circuit means for producing an output voltage in response to an average current therethrough;
   c. a pair of series connected capacitors in series with said output circuit means, said reference voltage means energizing said series connected capacitors with a substantially constant voltage;
   d. complementary field effect transistors individually shunting each of said capacitors alternately to shunt and discharge one of said capacitors while permitting the other capacitor to be charged by said reference voltage means;
   e. a switching transistor in a common emitter configuration adapted for energization by the input signal, the gate electrodes of said field effect transistors being coupled to the collector of said switching transistor;
   f. said field effect transistors having substrate electrodes, one of said field effect transistor substrate electrodes being connected to first said reference voltage terminal and the other of said field effect transistor substrate electrodes being connected to said second reference voltage terminal.

2. A frequency to DC converter as recited in claim 1 wherein said output circuit means is constituted by a third resistor and a third capacitor in parallel and is energized by capacitor charging current through said first and second capacitors, whereby the voltage coupled to said utilization means is proportional to the frequency input signal.

3. A frequency to DC converter as recited in claim 2 wherein said output circuit means comprises a fourth capacitor connected in parallel with said first and second capacitors and an impedance transformation means connected between said second reference voltage terminal and said output circuit means resistor.

4. A frequency to DC converter as recited in claim 3 wherein said reference voltage means includes a constant current source and a zener diode connected in series, said first and second reference voltage terminals being connected to said zener diode.

5. A frequency to DC converter as recited in claim 4 wherein said impedance transformation means comprises a voltage amplifier having unity gain.